(12) United States Patent
Yoshikawa

(10) Patent No.: US 12,309,839 B2
(45) Date of Patent: May 20, 2025

(54) COMMUNICATION APPARATUS, CONTROL METHOD, AND STORAGE MEDIUM

(71) Applicant: CANON KABUSHIKI KAISHA, Tokyo (JP)

(72) Inventor: Yuki Yoshikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/676,632

(22) Filed: May 29, 2024

(65) Prior Publication Data

US 2024/0314843 A1    Sep. 19, 2024

Related U.S. Application Data

(63) Continuation of application No. 17/568,294, filed on Jan. 4, 2022, now Pat. No. 12,028,899.

(30) Foreign Application Priority Data

Jan. 29, 2021    (JP) .................. 2021-013599

(51) Int. Cl.
*H04W 74/0816*  (2024.01)
*H04W 72/121*  (2023.01)
*H04W 84/12*  (2009.01)

(52) U.S. Cl.
CPC ..... *H04W 74/0816* (2013.01); *H04W 72/121* (2013.01); *H04W 84/12* (2013.01)

(58) Field of Classification Search
CPC ........... H04W 74/0816; H04W 72/121; H04W 84/12
See application file for complete search history.

(56) References Cited

U.S. PATENT DOCUMENTS

| 11,706,058 B2 | 7/2023 | Yoshikawa |
| 2020/0267541 A1 | 8/2020 | Huang et al. |

(Continued)

FOREIGN PATENT DOCUMENTS

| CA | 3036819 A1 | 4/2018 |
| JP | 2011-244358 A | 12/2011 |
| JP | 2017-028454 A | 2/2017 |
| JP | 2018-050133 A | 3/2018 |

OTHER PUBLICATIONS

Huang, P.K. et al., "Multi-link security consideration" IEEE 802.11-19/1822r9 (Nov. 2019) pp. 1-18.

(Continued)

*Primary Examiner* — Duc C Ho
(74) *Attorney, Agent, or Firm* — Carter, DeLuca & Farrell LLP

(57) ABSTRACT

A communication apparatus compliant with an IEEE 802.11 series standard capable of performing Multi-Link communication with a plurality of other communication apparatuses using a plurality of links with different frequency channels is provided. The communication apparatus generates a key for encrypting a frame to be communicated for each one of the plurality of links, receives, from a first communication apparatus from among the plurality of other communication apparatuses, a notification indicating disconnection or suspension of one or more links of the plurality of links, confirms a state of communication via the plurality of links between the plurality of other communication apparatuses and the communication apparatus in a case where the notification is received, and determines whether or not to re-generate the key for each one of the plurality of links on the basis of a result of the confirmation.

16 Claims, 5 Drawing Sheets

(56) References Cited

U.S. PATENT DOCUMENTS

| | | | |
|---|---|---|---|
| 2021/0050999 A1* | 2/2021 | Huang | H04L 9/14 |
| 2021/0282007 A1 | 9/2021 | Ho | |
| 2021/0297189 A1 | 9/2021 | Yoshikawa | |
| 2021/0321243 A1* | 10/2021 | Patil | H04W 76/15 |
| 2021/0368506 A1 | 11/2021 | Yoshikawa | |
| 2021/0384943 A1 | 12/2021 | Yoshikawa | |
| 2021/0385112 A1 | 12/2021 | Yoshikawa | |
| 2023/0156840 A1* | 5/2023 | Chitrakar | H04W 76/14 |
| | | | 370/329 |
| 2023/0327920 A1 | 10/2023 | Yoshikawa | |
| 2024/0305505 A1 | 9/2024 | Yoshikawa | |

OTHER PUBLICATIONS

Notice of Reasons for Refusal issued by the Japanese Patent Office on Nov. 18, 2024 in corresponding JP Patent Application No. 2021-013599, with English translation.

Nyberg et al., "Wireless Group Security Using MAC Layer Multicast," World of Wireless, Mobile and Multimedia Networks, IEEE, Jun. 1, 2007, pp. 1-8.

"Draft_Standards 11mdDraft P802.11 REV md_D3.0," IEEE Draft; REVMD_CL_12.FM, IEEE-SA, Piscataway, NJ USA, vol. 802. 11md drafts; 802.11 drafts; 802.11m drafts, No. D3.0, Oct. 15, 2019, pp. 1-205.

Extended European Search Report issued by the European Patent Office on Jun. 20, 2022 in corresponding EP Patent Application No. 22151028.2.

* cited by examiner

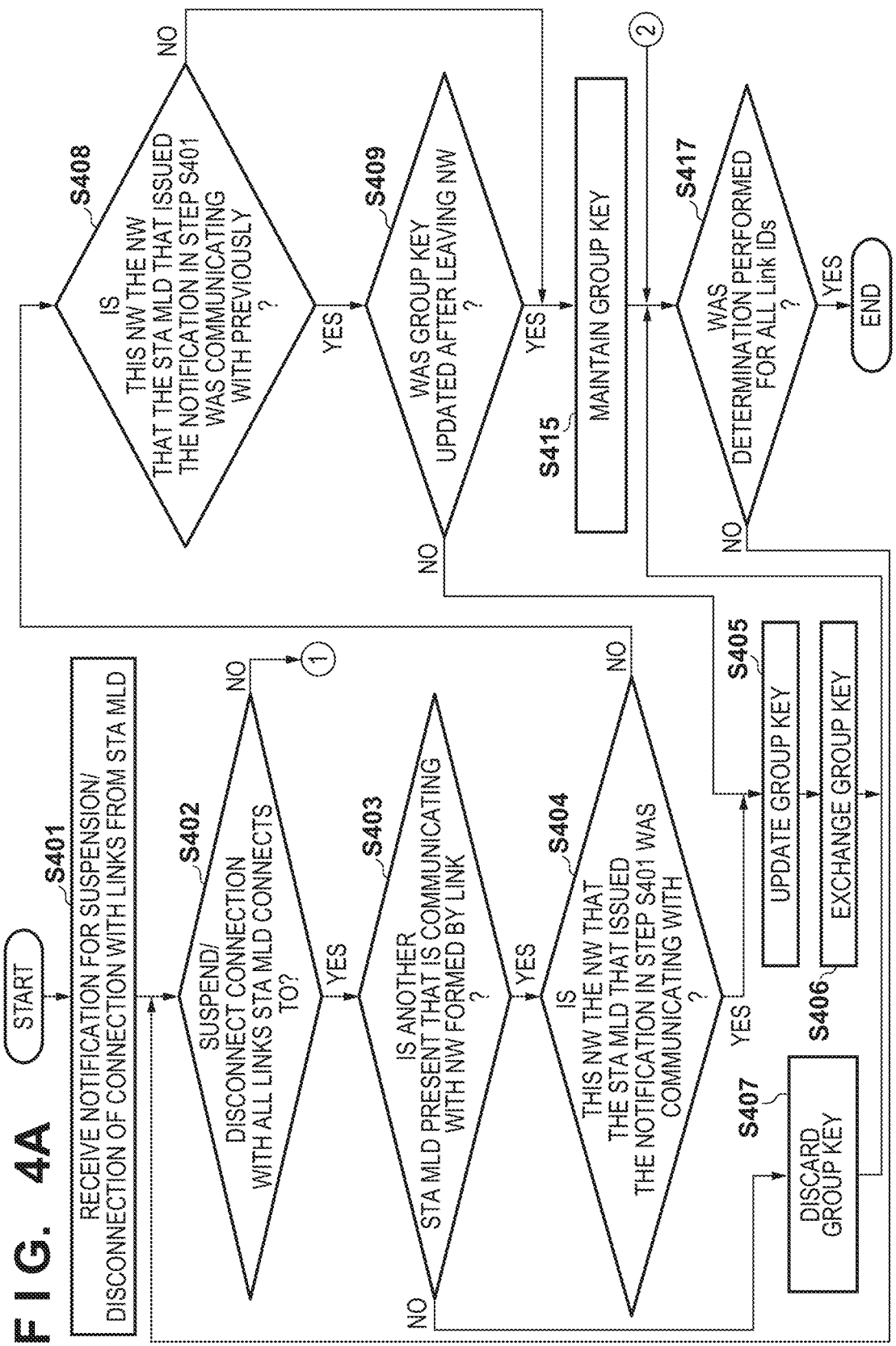

COMMUNICATION APPARATUS, CONTROL METHOD, AND STORAGE MEDIUM

CROSS REFERENCE TO RELATED APPLICATIONS

This application is a continuation of U.S. patent application Ser. No. 17/568,294, filed on Jan. 4, 2022, which claims the benefit of and priority to Japanese Patent Application No. 2021-013599, filed Jan. 29, 2021, each of which is hereby incorporated by reference herein in their entirety.

BACKGROUND OF THE INVENTION

Field of the Invention

The present invention relates to wireless communication technology.

Description of the Related Art

With recent increases in the amount of data communication, development of wireless local area network (LAN) communication technology has been proceeding. The Institute of Electrical and Electronics Engineers (IEEE) 802.11 series of standards are known as the main standard for wireless LAN. The IEEE 802.11 series of standards include standards such as IEEE 802.11a/b/g/n/ac/ax, and the like. For example, IEEE 802.11ax is a standard for technology that uses orthogonal frequency-division multiple access (OFDMA) to improve the communication speed in a congested state while having a high peak throughout of a maximum of 9.6 gigabits (Gbps) per second (Japanese Patent Laid-Open No. 2018-50133).

A task group has been created to work on IEEE 802.11be, the successor standard, with the aim of further improving throughput, further enhancing frequency utilization, and further enhancing communication latency. One issue being looked at in IEEE 802.11be includes one access point (AP) forming a plurality of links with one station (STA) at a frequency band of 2.4 GHz or the like and performing Multi-Link communication, i.e., simultaneous communication. Another issue includes, with Multi-Link communication, having an AP or STA that cannot perform a receive operation with another link when performing a transmission operation with a predetermined link due to hardware constraints of wireless communication devices.

A data frame for wireless LAN is typically transmitted in an encrypted state. Here, for encryption, a pairwise transient key (PTK) is used when transmitting data one on one, and a group transient key (GTK) or group key is used when transmitting data via multicast. The management methods of these keys are different. A PTK is managed per communication device unit and is shared only be the devices communicating one on one. For a GTK, one is generated for each link. Also, due to this characteristic, a GTK is shared by all devices joined to a network formed via a link. Also, a GTK can be updated by an AP.

Next, consider a case where one STA leaves a network formed by an AP and the AP maintains the network. In this case, if the AP does not update the GTK, the STA that left the network can read a multicast frame transmitting by the AP despite it no longer being joined to the network. Thus, for current standards, it is recommended that an AP updates the GTK after confirming that an STA has left the network.

This manner of updating the GTK can be applied to Multi-Link communication and can uphold the confidentiality of data frame transmission in Multi-Link communication.

On the other hand, in Multi-Link communication, there may be cases where only one or more links disconnect, but other links maintain a connection. Also, depending on the communication environment, frequent link switches may be expected. In such cases, it is plausible that a device that does not disconnect or switch links would have to frequently update the GTK despite its situation not changing. However, with a device that connects via Multi-Link, it is plausible that, when communication with one or more links is interrupted, the device can maintain the connection with an AP via another link, meaning that it is not necessary to update the GTK.

SUMMARY OF THE INVENTION

The present invention is directed at providing technology for prevents unnecessary group key updates in Multi-Link communication.

According to one aspect of the present invention, there is provided a communication apparatus compliant with an IEEE 802.11 series standard capable of performing Multi-Link communication with a plurality of other communication apparatuses using a plurality of links with different frequency channels, comprising: a key control unit configured to generate a key for encrypting a frame to be communicated for each one of the plurality of links; a reception unit configured to receive, from a first communication apparatus from among the plurality of other communication apparatuses, a notification indicating disconnection or suspension of one or more links of the plurality of links; a confirmation unit configured to execute confirmation of a state of communication via the plurality of links between the plurality of other communication apparatuses and the communication apparatus in a case where the notification is received; and a determination unit configured to determine whether or not to re-generate the key for each one of the plurality of links on the basis of a result of the confirmation.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A and 4B illustrate a flowchart of the processing executed by an AP MLD.

DESCRIPTION OF THE EMBODIMENTS

Figure 1:
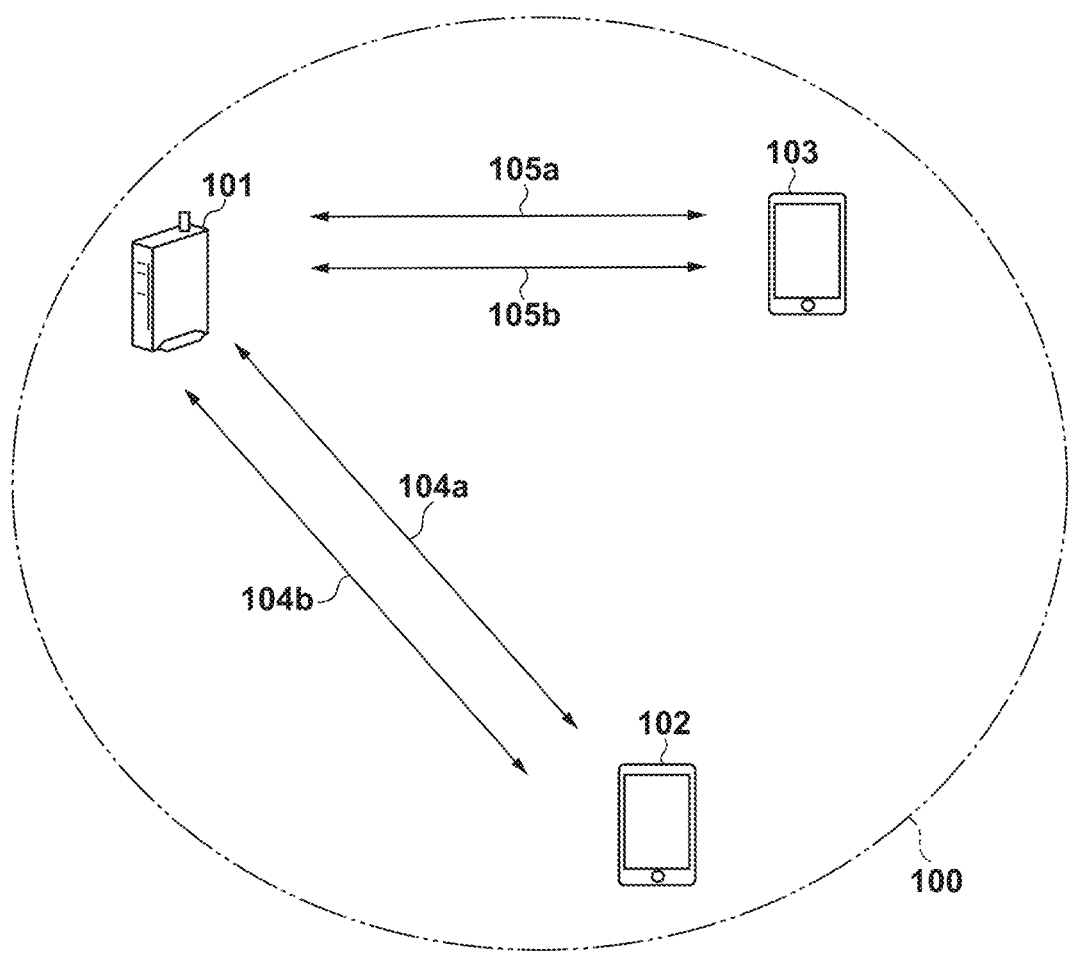
FIG. 1 is a diagram illustrating an example configuration of a wireless communication system.

Hereinafter, embodiments will be described in detail with reference to the attached drawings. Note, the following embodiments are not intended to limit the scope of the claimed invention. Multiple features are described in the embodiments, but it is not intended that the invention is limited to requiring all such features, and multiple such features may be combined as appropriate. Furthermore, in the attached drawings, the same reference numerals are given to the same or similar configurations, and redundant description thereof is omitted.

Hereinafter, an STA device capable of Multi-Link communication is referred to as a station Multi-Link device (STA MLD), and an AP device capable of Multi-Link communication is referred to as an access point Multi-Link device (AP MLD).

Configuration of Wireless Communication System FIG. 1 illustrates an example configuration of a wireless communication system according to the present embodiment. A present system 100 includes communication apparatuses 101, 102, and 103. The communication apparatuses 102 and 103 (hereinafter, referred to as station/terminal apparatus (STA) 102 and STA 103) are STA MLDs having a function of joining a network. The communication apparatus 101 (hereinafter, referred to as access point (AP)) 101 is an AP MLD having a function of forming a network. The AP 101 is capable of communicating with the STA 102 and STA 103.

The AP 101, the STA 102, and the STA 103 are each capable of performing wireless communication compliant with the IEEE 802.11be (Extreme/Extremely High Throughput (EHT)) standard. The AP 101, the STA 102, and the STA 103 are capable of communicating at frequencies including 2.4 GHz, 5 GHZ, 6 GHZ, 60 GHz, and the like. The frequency band used by the communication apparatuses is not limited to these, and, for example, different frequency bands may be used. Also, the AP 101, the STA 102, and the STA 103 are capable of using bandwidth of 20 MHz, 40 MHz, 80 MHz, 160 MHz, and 320 MHz. The bandwidth used by the communication apparatuses is not limited to these, and, for example, different bandwidths, such as 240 MHz and 4 MHz, may be used.

The AP 101 can implement multi-user (MU) communication in which the signals of multiple users are multiplexed by performing OFDMA communication compliant with the IEEE 802.11be standard. In OFDMA communication, a portion (resource unit (RU)) of the divided frequency band is allocated to each STA/STA MLD without overlap, and the carrier waves to each STA/STA MLD are orthogonal to one another. Thus, the AP MLD can communicate in parallel with the STA/STA MLDs in a specified bandwidth.

Note that in this example, the AP 101, the STA 102, and the STA 103 are compatible with the IEEE 802.11be standard, but may also be compatible with a standard prior to the IEEE 802.11be standard. Specifically, the AP 101, the STA 102, and the STA 103 may be compatible with at least one of the IEEE 802.11a/b/g/n/ac/ax standards. Also, in addition to the IEEE 802.11 series of standards, the AP 101, the STA 102, and the STA 103 may be compatible with other standards, such as Bluetooth (registered trademark), Near Field Communication (NFC), Ultra Wide Band (UWB), ZigBee, Multi Band OFMA Alliance (MBOA), and the like. UWB includes wireless USB, wireless 1394, WiNET, and the like. Also, the AP 101, the STA 102, and the STA 103 may be compatible with wired communication standards such as wired LAN.

Specific examples of the AP 101 include, but are not limited to, a wireless LAN router, a personal computer (PC), and the like. Also, the AP 101 may be an information processing device such as a radio chip capable of performing wireless communication compliant with the IEEE 802.11be standard. Also, specific examples of the STA 102 and the STA 103 include, but are not limited to, a camera, a tablet, a smart phone, a PC, a mobile phone, a video camera, a headset, and the like. Also, the STA 102 and the STA 103 may be an information processing device such as a radio chip capable of performing wireless communication compliant with the IEEE 802.11be standard.

The AP 101 and the STA 102 and the STA 103 perform Multi-Link communication (e.g. simultaneous communication over a plurality of links) by communicating with links established via a plurality of frequency channels. In the IEEE 802.11 series of standards, the bandwidth of each frequency channel is defined as 20 MHz. Here, frequency channel is a frequency channel defined by the IEEE 802.11 series of standards, and in the standards, a plurality of frequency channels are defined in each frequency band including 2.4 GHz, 5 GHZ, 6 GHZ, and 60 GHz. Note that with a single frequency channel, a bandwidth of 40 MHz or greater may be used via the channel bonding of adjacent frequency channels.

In the present embodiment, for example, the AP 101 can establish a link 104a via a first frequency channel of the 2.4 GHz band and communicate with the STA 102. In parallel with this, the STA 102 can establish a link 104b via a second frequency channel of the 5 GHz band and communicate with the AP 101. In this case, the STA 102 performs Multi-Link communication in which the link 104b is maintained in parallel with the link 104a. In this manner, by the AP 101 establishing a plurality of links (Multi-Link) with the STA 102 using a plurality of frequency channels, the throughput of the communication with the STA 102 can be improved. In a similar manner, by the STA 103 forming a link 105a and a link 105b with the AP 101, the communication quality can be improved.

Note that in Multi-Link communication, a plurality of links of different frequency bands may be established. For example, the AP 101 and the STA 102 may, in addition to the link 104a in the 2.4 GHz band and the link 104b in the 6 GHz band, establish another link in the 5 GHz band. Alternatively, a link may be established via different channels included in the same frequency band. For example, the AP 101 and the STA 102 may establish a six channel link in the 2.4 GHz band as the link 104a, as well as a one channel link in the 2.4 GHz band as the link 104b.

Also, links of the same frequency band and links with the same frequency band may coexist. For example, the AP 101 and the STA 102 may, in addition to the six channel link 104a in the 2.4 GHz band, establish the one channel link 104b in the 2.4 GHz band and another 149 channel link in the 5 GHz band. By the AP 101 establishing a plurality of connections of different frequencies with the STA 102, in a case where a certain band is congested, communication with the STA 102 on another band can be established. This allows a decrease in throughput and communication delay in communication with the STA 102 to be prevented.

For each link, identification information (hereinafter, referred to as Link ID) for each network formed including that link is allocated. For example, take the example in which the STA 102 and the STA 103 join, from among the networks formed by the AP 101, a 2.4 GHz network. In a case where the links formed by the STA 102 and the STA 103 and the AP 101 correspond to the link 104a and the link 105a respectively, a common Link ID of 1 is allocated to these links. In a similar manner, in a case where the STA 102 and the STA 103 join a 5 GHz network and the links formed here correspond to the link 104b and the link 105b respectively, a Link ID of 2 is allocated to these links. The Link ID value here is an example, and a different value may be allocated in each case or a Link ID may be allocated for each formed link.

Note that the system 100 in FIG. 1 is configured by one AP MLD and two STA MLDs. However the number and arrangement of the AP MLD and STA MLD are not limited to this configuration. For example, in addition to the configuration of FIG. 1, an additional STA MLD may be provided. In this case, the frequency band, link number, and frequency bandwidth of each established link may be discretionarily set.

In a case where Multi-Link communication is performed, between the AP 101 and the STA 102 or between the AP 101 and the STA 103, one piece of data may be divided and transmitted to a partner apparatus via a plurality of links. Also, the AP 101 and the STA 102 and the AP 101 and the STA 103 may be configured to perform Multiple-Input and Multiple-Output (MIMO) communication. In this case, the AP 101 and the STA 102 and the STA 103 include a plurality of antennas, with different signals being sent from the antennas using the same frequency channel. The receiving side simultaneously receives all of the signals that arrived from the plurality of streams using the antennas, separates the signals of the streams, and decodes them. In this manner, by performing MIMO communication, the AP 101 and the STA 102 and the STA 103 can communicate a larger amount of data in the same amount of time compared to a case where MIMO communication is not performed. Also, the AP 101 and the STA 102 and the STA 103, in a case where Multi-Link communication is performed, may perform MIMO communication at one or more links.

The AP 101 multicast transmits a group addressed frame to the STA 102 and the STA 103 joined to the formed network. A group addressed frame is, for example, a group addressed data frame, a group addressed management frame, a beacon frame, and the like. The AP 101 transmits a group address frame for each network. For example, in a case where a network with a Link ID of 1 is formed by the link 104a and the link 105a, the AP 101 transmits a group addressed frame using the network with a Link ID of 1. In a similar manner, the AP 101 can transmit a group addressed frame using a network allocated with a different Link ID. These group addressed frames may be the same or may be different.

AP and STA Configuration

Figure 2:
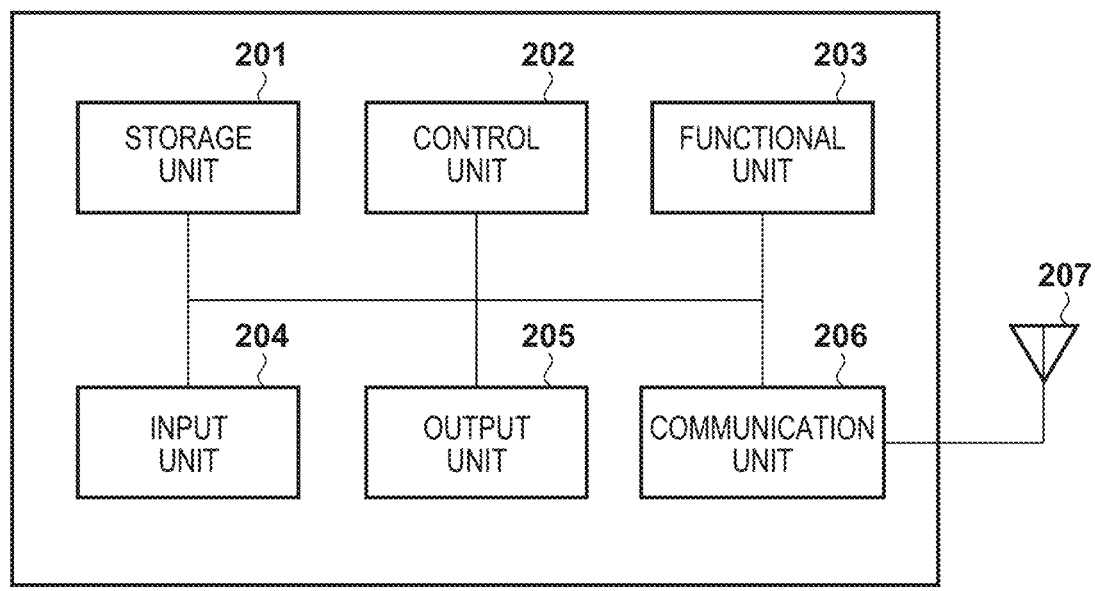
FIG. 2 is a diagram illustrating an example of the hardware configuration of a communication apparatus.

FIG. 2 is a diagram illustrating an example of the hardware configuration of the AP 101 according to the present embodiment. The AP 101, as an example of the hardware configuration, includes a storage unit 201, a control unit 202, a functional unit 203, an input unit 204, an output unit 205, a communication unit 206, and an antenna 207. Note that there may be a plurality of antennas. Also, note that the STA 102 and the STA 103 may have a hardware configuration similar to that of the AP 101.

The storage unit 201 is constituted by one or more memory, such as a read only memory (ROM) or a random access memory (RAM), and stores computer programs for executing various operations described below and stores various pieces of information such as communication parameters for wireless communication. Note that, other than a ROM, RAM, or other such memory, a storage medium, such as a flexible disk, a hard disk, an optical disk, a magneto-optical disk, a CD-ROM, a CD-R, a magnetic tape, a non-volatile memory card, a DVD, or the like, may be used as the storage unit 201. Also, the storage unit 201 may be provided with a plurality of memory.

The control unit 202, for example, is constituted by one or more processors, such as a central processing unit (CPU), a micro processing unit (MPU), or the like, and completely controls the AP 101 by executing computer programs stored in the storage unit 201. Note that the control unit 202 may completely control the AP 101 via cooperation of the computer program stored on the storage unit 201 and an operating system (OS). Also, the control unit 202 generates data and signals (radio frame) for transmission via communication with other communication apparatuses. Also, the control unit 202 may be provided with a plurality of processors such as a multicore processor and completely control the AP 101 via the plurality of processors.

Also, the control unit 202 controls the functional unit 203 and executes predetermined processing, such as wireless communication, image capture, printing, projecting, and the like. The functional unit 203 is hardware for the AP 101 to execute a predetermined function.

The input unit 204 receives various operations from a user. The output unit 205 outputs to a user via a monitor screen or a speaker, for example. In this example, output via the output unit 205 may correspond to displaying on a monitor screen, outputting audio via a speaker, outputting vibrations, and the like. Note that the input unit 204 and the output unit 205 may be implemented as a single module via a touch panel, for example. Also, the input unit 204 and the output unit 205 may be integrally formed with each STA 102 or may be a separately formed.

The communication unit 206 executes control of wireless communication compliant with the IEEE 802.11be standard. Also, the communication unit 206 may execute control of wireless communication compliant with another IEEE 802.11 series standard in addition to the IEEE 802.11be standard and may execute control of wired communication using a wired LAN or the like. The communication unit 206 controls the antenna 207 and transmits and receives signals for wireless communication generated by the control unit 202.

Note that in a case where the AP 101, in addition to the IEEE 802.11be standard, is compatible with an NFC standard, Bluetooth standard, or the like, the AP 101 may execute control of wireless communication compliant with these communication standards. Also, in a case where the AP 101 is capable of wireless communication compliant with a plurality of communication standards, a configuration may be used in which the communication unit compatible with the communication standards and the antennas are provided separate. The AP 101 communicates data, such as image data, document data, video data, and the like, via the communication unit 206. Note that the antenna 207 may be separately formed from the communication unit 206 or may be formed as a single module together with the communication unit 206.

The antenna 207 is an antenna capable of communication at a frequency band including 2.4 GHz, 5 GHZ, 6 GHZ, and the like. In the present embodiment, the AP 101 includes one antenna, but a plurality (for example, three) of antennas may be provided. Also, a different antenna may be provided for each frequency band. Furthermore, in a case where the AP 101 includes a plurality of antennas, the communication unit 206 may be provided corresponding to each antenna.

Figure 3:
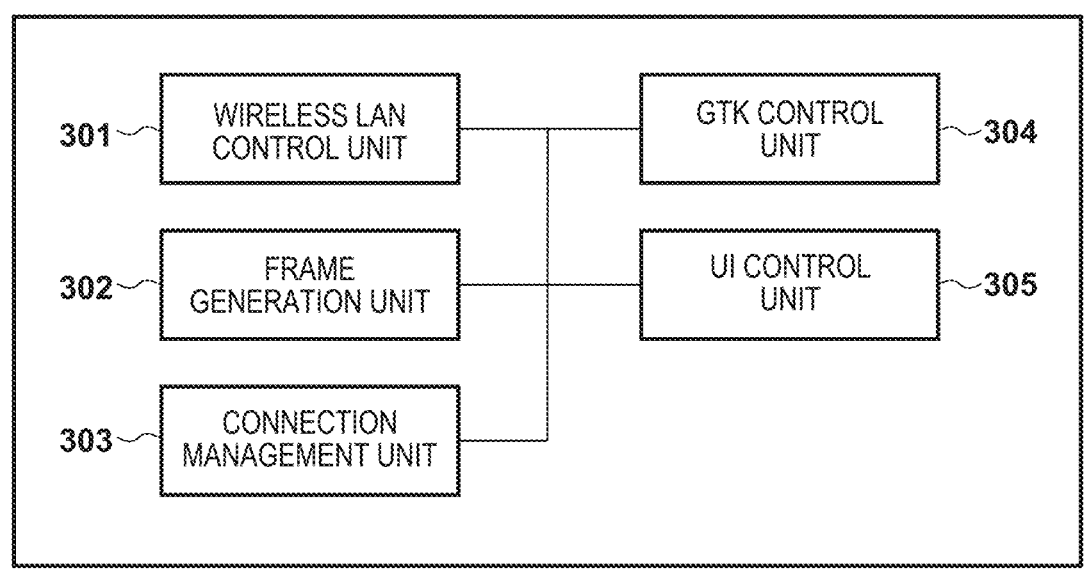
FIG. 3 is a diagram illustrating an example of the functional configuration of a communication apparatus.

FIG. 3 is a diagram illustrating an example of the functional configuration of the AP 101 according to the present embodiment. The AP 101, as an example of the functional configuration, includes a wireless LAN control unit 301, a frame generation unit 302, a connection management unit 303, a GTK control unit 304, and a user interface (UI)

control unit 305. Also, note that the STA 102 and the STA 103 may have a functional configuration similar to that of the AP 101.

The wireless LAN control unit 301 may include a program for executing control for transmitting and receiving radio signals to and from other wireless LAN apparatuses. The wireless LAN control unit 301 transmits and receives a frame generated by the frame generation unit 302 via the communication unit 206 and the antenna 207 in compliance with an IEEE 802.11 series standard and executes wireless LAN communication control. Note that the number of wireless LAN control units is not limited to one and may be two or three or more.

The frame generation unit 302 generates a radio frame to be transmitted by the wireless LAN control unit 301. The contents of the radio frame generated by the frame generation unit 302 may be restricted by the settings stored in the storage unit 201 (FIG. 2). Also, the contents may be changed from the UI control unit 305 via user settings. The information of the generated frame is transmitted to the wireless LAN control unit 301 and then transmitted to the communication partner apparatus via the communication unit 206 and the antenna 207.

The connection management unit 303, as a result of frame exchange by the wireless LAN control unit 301, confirms/manages the connection state/communication state of each link to the partner apparatus (e.g. another communication apparatus). In an example, the communication state/connection state or state of communication represents status of communication between a communication apparatus (e.g. AP 101), which is capable of performing Multi-Link communication with a plurality of other communication apparatuses (or partner apparatuses) via a plurality of links, and the plurality of other communication apparatuses. In other words, a state of communication may correspond to one or more different communication states between a partner apparatus and the AP 101: such as, whether the partner apparatus and the AP 101 are communicating over the same link (still connected) and/or a different link for the first time (newly connected) and/or a link between the partner apparatus and the AP 101 is subject to a disconnection or suspension (disconnected).

The GTK control unit 304 functions as a key controller that executes control relating to the GTK. For example, the GTK control unit 304 generates and manages a GTK used (applied) at each link. Also, the GTK control unit 304 determines whether or not to re-generated (update) the GTK on the basis of the confirmation result (connection state/communication state of each link) obtained from the connection management unit 303. In a case where it is determined to re-generate, the GTK control unit 304 re-generates a GTK. The GTK control unit 304 exchanges the (re-)generated GTK with other communication apparatuses via the wireless LAN control unit 301.

The UI control unit 305 generates control signals on the basis of an operation of the input unit 204 by a user (user setting) and transmits the signals to the components. Also, the UI control unit 305 executes control of the various outputs to the output unit 205.

Flow of Processing by AP MLD

Figure 4B:
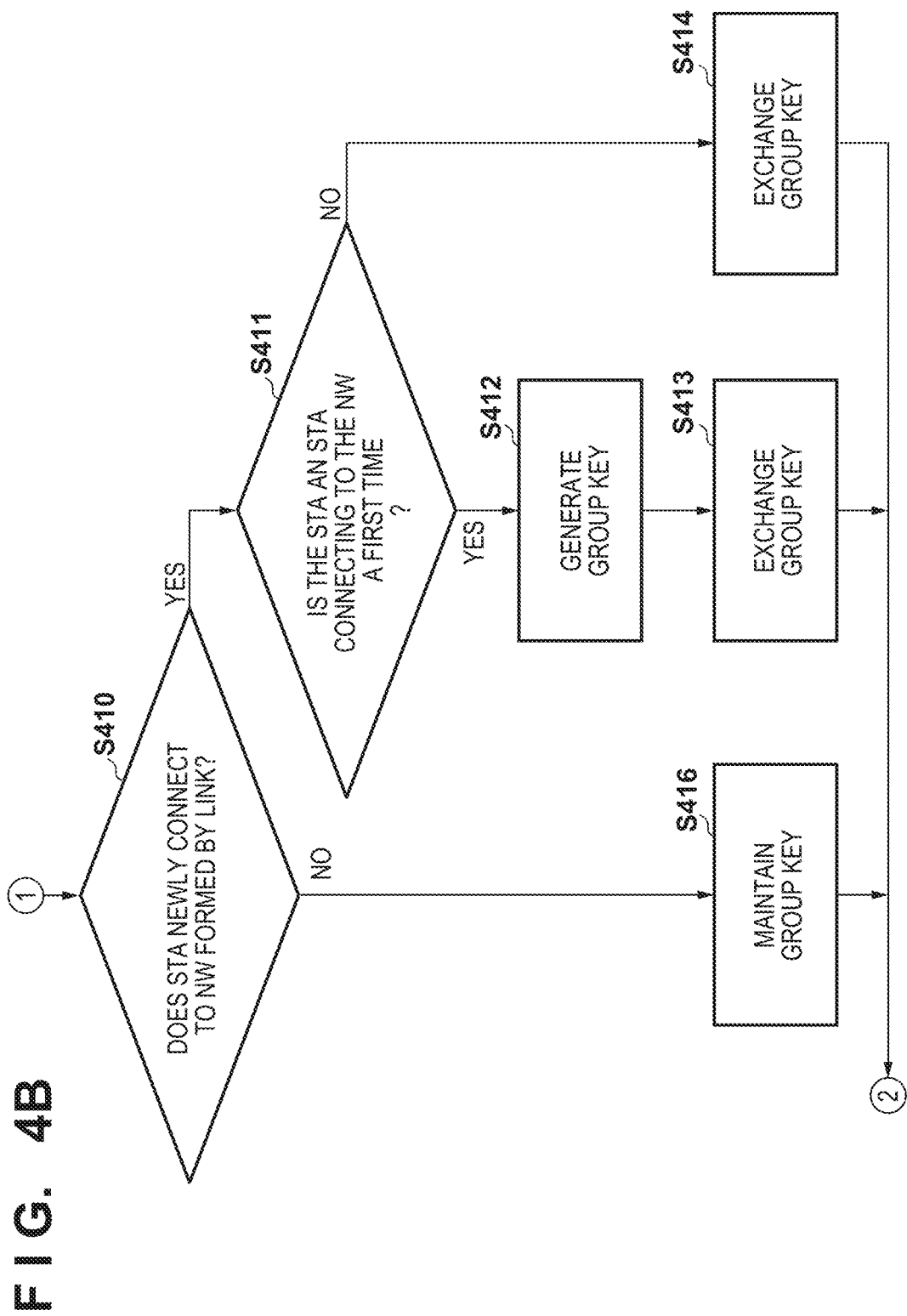

FIGS. 4A and 4B shows a diagram illustrating a flowchart of the processing executed by the AP MLD. Specifically, FIGS. 4A and 4B illustrates the flow of processing executed by the AP MLD to determine whether to update, generate, or discard a GTK.

The processing of FIGS. 4A and 4B is started when, after the STA MLD and the AP MLD starts Multi-Link communication (Multi-Link connection is established), a notification to suspend or disconnect (suspend/disconnect) the connection of one or more or all of the links is received from the STA MLD. Alternatively, the processing may start when a notification to suspend or disconnect the connection of one or more or all of the links is transmitted to a specific STA MLD from the AP. In FIGS. 4A and 4B, the former is illustrated.

Here, the flowchart of FIGS. 4A and 4B will be described using the example described above of the AP 101 executing the processing. The processing of the flowchart may be implemented by the control unit 202 of the AP 101 executing a control program stored in the storage unit 201 such that calculation of information and processing and control of each piece of hardware is executed.

The wireless LAN control unit 301 of the AP 101 first receives a frame (notification) indicating the suspension or disconnection of the connection with one or more or all of the links from the currently-connected STA MLD (the STA 102 in the present description) (step S401). The frame may be a deauthentication frame or a disassociation frame as defined in IEEE 802.11. Also, these frames may be used as frames extended for Multi-Link communication. Alternatively, the frame may be a frame for switching (transitioning) to a connection with another link after the connection with one or more links is disconnected. A frame such as that illustrated in FIG. 5 can be used as a frame for switching the connection link to another link.

Figure 5:
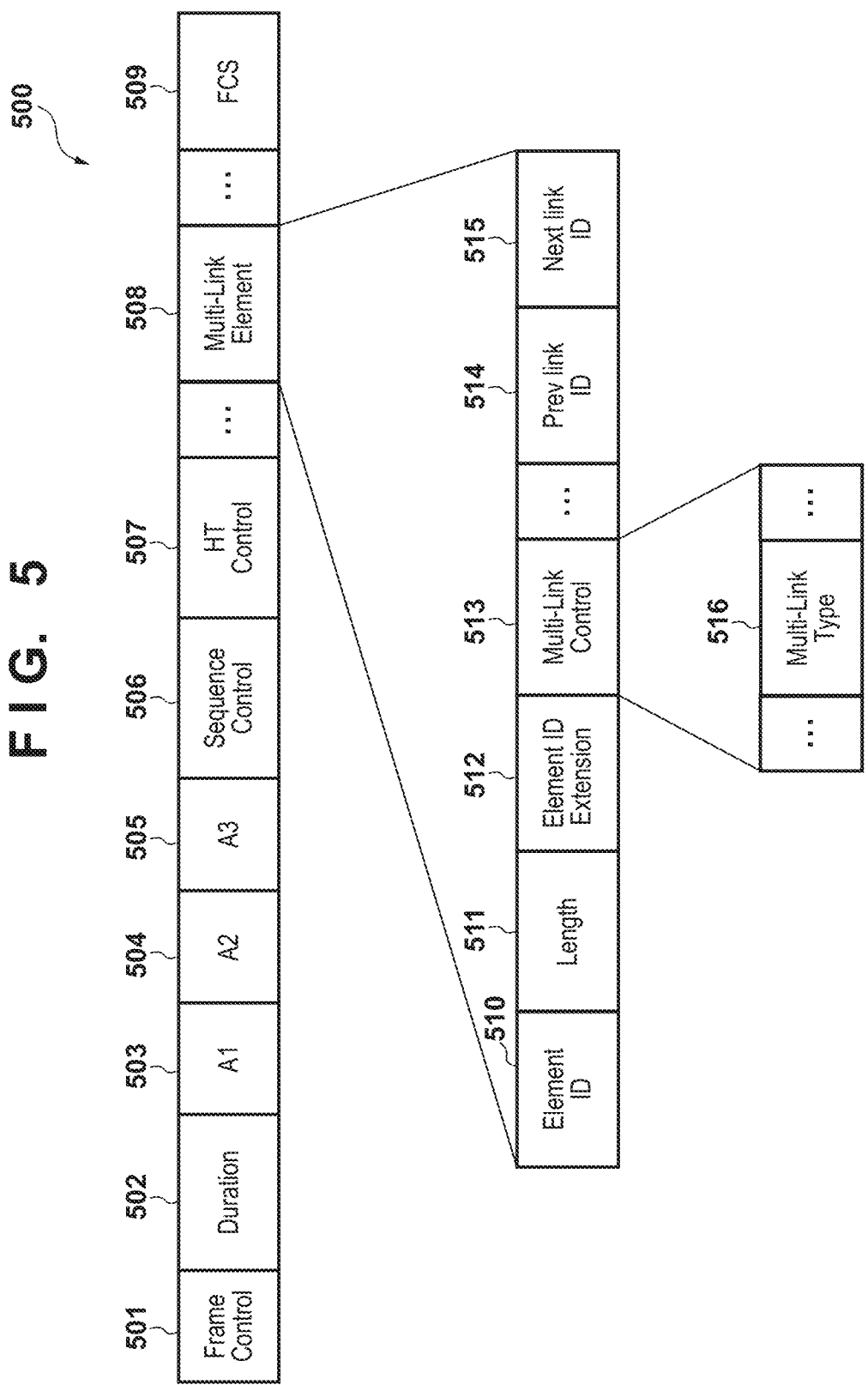
FIG. 5 is a diagram illustrating an example of a frame indicating the switching to another link after the disconnection of one or more links in Multi-Link communication.

FIG. 5 is a diagram illustrating an example of a frame indicating the switching of a connection link to another link in Multi-Link communication. The frame illustrated in FIG. 5 is a frame extended from a frame defined in IEEE 802.11.

The fields and subfields in a frame 500 illustrated in FIG. 5 include, from the front, a frame control field 501, a duration field 502, an A1 field 503, an A2 field 504, an A3 field 505, a sequence control field 506, a HT control field 507, a Multi-Link element field 508, and a FCS field 509. Note that the present frame is described as a type of Management frame as defined in IEEE 802.11 but may be a type of control frame. In this case, for example, the A3 field 505, the sequence control field 506, and the HT control field 507 may not be included.

The frame control field 501 indicates the type of frame. Whether the type of frame is a deauthentication frame or a disassociation frame can be indicated by the value of the type subfield or subtype subfield, not illustrated, including in the frame control field 501. Any type of frame may be used as the frame used in step S401. Alternatively, the frame may be newly defined as a frame that indicates link switching when the value of the type sub field is 00 and the value of the subtype subfield is 1111. Furthermore, the frame may be used as an action frame with a type subfield of 00 and a subtype subfield of 1101, and in the frame, an element meaning a channel switch or disconnection of one or more links may be prepared.

The Multi-Link element field 508 indicates an example of elements assigned to the frame (included in the frame). The Multi-Link element field 508 includes an element ID subfield 510, a length subfield 511, an element ID extension subfield 512, a Multi-Link control subfield 513, a prev link ID subfield 514, and a next link ID subfield 515. Note that in a case where the type of frame is an action frame, the contents of the subfields may be expressed using a category subfield instead of the element ID subfield 510 and the length subfield 511. Also, the subfields of the Multi-Link element field 508 are not all required. For example, only the prev link ID subfield 514 or only the next link ID subfield 515 may be included. Alternatively, the Multi-Link element field 508 may be configured by combining a subfield described above and one or more other subfields.

The specific value of the element ID subfield 510 is 255, for example, and the value of the element ID extension subfield 512 is 15, for example. This can indicate that the element assigned to the frame is a Multi-Link element. The Multi-Link control subfield 513 indicates which operation, from among operations relating to Multi-Link, the assigned Multi-Link element instructs to perform. For example, the Multi-Link control subfield 513 includes the Multi-Link type subfield 516 and can indicate the change of the connection link by the value being set to 0×4. Alternatively, by setting the value to 0×5, link disconnection may be indicated.

The prev link ID subfield 514 indicates the link ID of the link that is the subject of connection suspension or disconnection. The next link ID subfield 515 indicates the link ID of the link of the new connection replacing the disconnected link. For example, when the STA 102 suspends the connection with a link with a link ID of 2 and establishes a new connection with a network constituted by a link with a link ID of 3, the value of the prev link ID subfield 514 is 2 and the value of the next link ID subfield 515 is 3. Also, when the STA 102 only disconnects the connection with a link with a link ID of 2, the value of the next link ID subfield 515 may be 0 or the next link ID subfield 515 may not be assigned.

Returning to the description of FIGS. 4A and 4B, the following processing (the processing from step S402 onward) is executed for each network, i.e., link ID, formed by the AP 101. When a frame indicating the suspension or disconnection of a connection with a link is received from the STA 102 in step S401, the connection management unit 303 of the AP 101 determines whether the frame means to suspend/disconnect the connection with all of the links the STA 102 connects to (step S402).

In a case where the received frame means to suspend/disconnect the connection with all of the links the STA 102 connects to (YES in step S402), the processing proceeds to step S403. In step S403, the connection management unit 303 of the AP 101 then determines whether or not another STA MLD other than the STA 102 is present that is communicating with the network (NW) formed by the target link (link with a link ID of x) (step S403). In the present step, it may be determined whether another STA MLD is communicating with the AP 101 using a link other than the link the STA 102 is requesting the suspension/disconnection for. In a case where another STA MLD is not present that is communicating with the network (using the link with a link ID of x) formed by the link with a link ID of x (NO in step S403), the GTK control unit 304 discards the group key for the link (step S407). In a case where another STA MLD is present that is communicating with the network formed by the link with a link ID of x (YES in step S403), the processing proceeds to step S404. In step S404, the connection management unit 303 then determines whether or not the network formed by the link with a link ID of x is a network the STA 102 (the STA MLD that issued a notification in step S401) was communicating with (joined to). In other words, the connection management unit 303 determines whether the link with a link ID of x is the link (link subject to suspension/disconnection) that the STA 102 requested suspension/disconnection of in step S401.

In a case where the STA 102 was communicating with the network formed by the link with a link ID of x (YES in step S404), the GTK control unit 304 of the AP 101 re-generates (updates) the group key for the link with a link ID of x (step S405). Also, the wireless LAN control unit 301 of the AP 101 executes group key exchange to transmit the updated and newly generated group key (step S406).

In a case where the STA 102 was not communicating with the network formed by the link with a link ID of x (NO in step S404), the processing proceeds to step S408. In step S408, the connection management unit 303 of the AP 101 then determines whether or not the network formed by the link with a link ID of x is a network the STA 102 (the STA MLD that issued a notification in step S401) previously (in the past) communicated with (joined). In a case where the STA 102 did not previously communicate with the network formed by the link with a link ID of x (NO in step S408), the GTK control unit 304 of the AP 101 maintains the group key without updating the group key for the link with a link ID of x (step S415).

In a case where the STA 102 previously communicated with the network formed by the link with a link ID of x (YES in step S408), the connection management unit 303 of the AP 101 determines whether or not the group key has been updated for the link after the STA 102 left the network (step S409). In a case where it has been updated (YES in step S409), the GTK control unit 304 of the AP 101 maintains the group key without updating the group key for the link with a link ID of x (step S415). In a case where it has not been updated (NO in step S409), the GTK control unit 304 of the AP 101 updates the group key for the link with a link ID of x (step S405), and the wireless LAN control unit 301 executes group key exchange (step S406).

Note that the AP 101 may execute the processing of step S408 and step S409 together. In other words, the connection management unit 303 may confirm whether the STA 102 had joined to the network formed by the link with a link ID of x after the group key was last updated, and the GTK control unit 304 may maintain the group key in a case where it had not joined and may update the group key in a case where it had joined.

Next, the processing in a case where, via the determination of step S402, the received frame means to not suspend or disconnect the connection of all of the links the STA 102 connects to (NO in step S402) will be described. This case, for example, corresponds to cases such as where the STA 102 suspends or disconnects from a connection with a link and reconnects with another link and cases such as where the STA 102 suspends or disconnects from a connection with a link and continues the connection with another link, and in this case the processing proceeds to step S410. The connection management unit 303 of the AP 101 confirms whether a STA (or STA MLD) for the first time newly connects to the network (NW) formed by the target link (the link with a link ID of x) (step S410).

In a case where no STA newly connects (NO in step S410), the GTK control unit 304 maintains the group key for the link with a link ID of x (step S416). In a case where a STA newly connects (YES in step S410), the connection management unit 303 of the AP 101 then confirms whether the newly connecting STA is a first STA connecting to the network (step S411). That is, it is confirmed whether another STA already connects to the network formed by the link with a link ID of x. In a case where the newly connecting STA is not the first STA connecting to the network (NO in step S411), the wireless LAN control unit 301 of the AP 101 exchanges a pre-generated group key (step S414). In a case where the newly connecting STA is the first STA connecting to the network (YES in step S411) the GTK control unit 304 of the AP 101 generates a group key for the link with a link ID of x (step S412), and the wireless LAN control unit 301 executes group key exchange (step S413).

The AP 101 executes the processing described above for each formed network, i.e., for each link ID. In a case where processing for all of the link IDs has been completed (YES in step S417), the process ends. Note that in the flowchart described above, the processing of step S404 may be omitted. For example, in a case where the STA 102 is connected to the AP 101 using one link and requests the suspension or disconnection of the connection with the link (YES in step S403) and another STA MLD is communicating with the network formed by the link (YES in step S403), the processing may proceed to step S405 and the AP 101 may re-generate a group key.

Next, an example based on the processing of FIGS. 4A and 4B will be described. Hereinafter, the communication system illustrated in FIG. 1 will be referenced.

Example 1

In Example 1, the AP 101 forms a network with six channels in the 2.4 GHz band with a link ID of 1, a network with 36 channels in the 5 GHz band with a link ID of 2, and a network with 5.955 GHz in the 6 GHz band with a link ID of 3. The STA 102 joins the network with a link ID of 1 via the link 104a and joins the network with a link ID of 2 via the link 104b. The STA 103 joins the network with a link ID of 1 via the link 105a and joins the network with a link ID of 3 via the link 105b.

Take an example of where, in this state (e.g. state of communication), the STA 102 leaves the network it joined with the link ID of 1 and joins the network with a link ID of 3. In other words, an example in which the STA 102 disconnects from the link with a link ID of 1 and connects to the link with a link ID of 3 (NO in step S402 of FIGS. 4A and 4B).

This means that in this case, one STA MLD joined to the network formed by the link with a link ID of 1 leaves the network. However, because the STA 102 continues to be connected to the AP 101 via a different link (i.e., the link with a link ID of 2), the AP 101 maintains the group key for the link with a link ID of 1 (NO in step S410, step S416).

Also, because the STA MLD does not newly connect or disconnect to the network formed by the link with a link ID of 2, the AP 101 maintains the group for the link with a link ID of 2 (NO in step S410, step S416).

Also, the STA 102 newly joins the network formed by the link with a link ID of 3 (YES in step S410, NO in step S411). The STA 103 is joined to the network formed by the link with a link ID of 3. Here, group key exchange is executed between the AP 101 and the STA 102 (step S414).

Example 2

In Example 2, the AP 101 forms a network with six channels in the 2.4 GHz band with a link ID of 1, a network with 36 channels in the 5 GHz band with a link ID of 2, and a network with 5.955 GHz in the 6 GHz band with a link ID of 3. The STA 102 joins the network with a link ID of 1 via the link 104a and joins the network with a link ID of 2 via the link 104b. The STA 103 joins the network with a link ID of 1 via the link 105a and joins the network with a link ID of 3 via the link 105b.

Let's take an example of where, in this state, the STA 102 leaves from all of the joined networks. In other words, an example in which the STA 102 disconnects from the link with a link ID of 1 and the link with a link ID of 2 (YES in step S402).

This means that in this case, one STA MLD joined to the network formed by the link with a link ID of 1 leaves the network. Also, all connections between the AP 101 and the STA 102 are cut. However, the STA 103 is joined to the network formed by the link with a link ID of 1 (YES in step S403, YES in step S404). Thus, the AP 101 updates (re-generates) the group key for the link with a link ID of 1 (step S405). Then, the AP 101 executes group key exchange of the updated group key with the STA 103 (step S406).

Furthermore, all of the STA MLD joined to the network formed by the link with a link ID of 2 leave the network (NO in step S403). Accordingly, the AP 101 discards the stored group key for the link with a link ID of 2 (step S407).

Also, the STA MLD does not newly connect or disconnect to the network formed by the link with a link ID of 3. Also, in the present example, the STA 102 has not previously joined to the network formed by the link. Accordingly, the AP 101 maintains the group key for the link with a link ID of 3 (YES in step S403, NO in step S404, NO in step S408, step S415).

Example 3

In Example 3, the AP 101 forms a network with six channels in the 2.4 GHz band with a link ID of 1, a network with 36 channels in the 5 GHz band with a link ID of 2, and a network with 5.955 GHz in the 6 GHz band with a link ID of 3. The STA 102 joins the network with a link ID of 1 via the link 104a and joins the network with a link ID of 2 via the link 104b. The STA 103 joins the network with a link ID of 1 via the link 105a and joins the network with a link ID of 2 via the link 105b.

Take an example of where, in this state, the STA 102 leaves the network it joined with the link ID of 2 and joins the network with a link ID of 3. In other words, an example in which the STA 102 disconnects from the link with a link ID of 2 and connects to the link with a link ID of 3 (NO in step S402 of FIGS. 4A and 4B).

In this case, because the STA MLD does not newly connect or disconnect to the network formed by the link with a link ID of 1, the AP 101 maintains the group for the link with a link ID of 1 (NO in step S410, step S416).

This means that in this case, one STA MLD joined to the network formed by the link with a link ID of 2 leaves the network. However, because the STA 102 continues to be connected to the AP 101 via a different link (i.e., the link with a link ID of 2), the AP 101 maintains the group key for the link with a link ID of 2 (NO in step S410, step S416).

Also, at the network formed by the link with a link ID of 3, from a state of the STA MLD not being joined, the STA MLD newly joins the network (YES in step S410, YES in step S411). Thus, the AP 101 newly generates a group key for the link with a link ID of 3 (step S412) and executes group key exchange with the STA 102 (step S413).

With these operations, the AP 101 can reduce instances of the group key being updated and maintain a state in which a STA MLD not currently joined to the network does not know the group key.

Note that in the embodiment described above, the AP 101 forms three networks operating via Multi-Link. However, the number of networks is not limited to three. For example, there may be two or four or more networks.

Also, in the embodiment described above, the AP 101 functions as an AP. However, in a case where the AP 101 is a device for managing group keys, the AP 101 may not function as an AP. For example, it may be considered as one of the STA when STAs connect. For example, it may be a device that operates as a group owner (GO) for Wi-Fi Direct.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-013599, filed Jan. 29, 2021, which is hereby incorporated by reference herein in its entirety.

What is claimed is:

1. A communication apparatus, comprising:
   an establishment unit configured to establish, between the communication apparatus and a first other communication apparatus, a plurality of links including a first link via a first frequency channel and a second link via a second frequency channel;
   a receiving unit configured to receive, from the first other communication apparatus, a frame indicating that one or more links are to be disconnected or interrupted; and
   a control unit configured to perform control to update a group key in a case where the receiving unit receives the frame indicating all of the plurality of links are to be disconnected or interrupted,
   wherein the control unit performs control not to update the group key in a case where the receiving unit receives the frame indicating not all of the plurality of links are to be disconnected or interrupted.

2. The communication apparatus according to claim 1, further comprising a generation unit configured to generate a first group key for encrypting a frame communicated via the first link and a second group key for encrypting a frame communicated via the second link.

3. The communication apparatus according to claim 2, wherein the frame is a group addressed frame.

4. The communication apparatus according to claim 1, wherein the frame indicating not all of the plurality of links are to be disconnected or interrupted is a frame indicating disconnection of the all of the plurality of links between the communication apparatus and the first other communication apparatus, and indicating addition of a new link between the communication apparatus and the first other communication apparatus.

5. The communication apparatus according to claim 1, wherein the frame indicating all of the plurality of links are to be disconnected or interrupted is a Deauthentication frame or a Disassociation frame.

6. The communication apparatus according to claim 1, wherein in a case where the receiving unit receives, from the first other communication apparatus, the frame indicating all of the plurality of links are to be disconnected or interrupted, the control unit performs control to update the group key for a link, from among the plurality of links, that is established by a second other communication apparatus different from the first other communication apparatus.

7. The communication apparatus according to claim 6, wherein a link via the first frequency and established between the communication apparatus and the first other communication apparatus is identified by a same Link ID as a link via the first frequency and established between the communication apparatus and the second other communication apparatus.

8. The communication apparatus according to claim 7, wherein in a case where the receiving unit receives, from the first other communication apparatus, the frame indicating all of the plurality of links are to be disconnected or interrupted, the control unit performs control to discard the group key for a link, from among the plurality of links, that is not established by a second other communication apparatus different from the first other communication apparatus.

9. The communication apparatus according to claim 6, further comprising a sharing unit configured to share, with the second other communication apparatus, the group key updated.

10. The communication apparatus according to claim 1, wherein, in a case where the communication apparatus is to establish a link between the communication apparatus and a third other communication apparatus, the control unit performs control to:
    in a case where the third other communication apparatus is to join a first network that the first other communication apparatus has already joined, share a group key for the first network, which has been already generated, with the third other communication apparatus; and
    in a case where the third other communication apparatus is to join a second network that no other communication apparatus joins, generate a group key for the second network.

11. The communication apparatus according to claim 1, wherein the group key is a GTK.

12. The communication apparatus according to claim 1, wherein the communication apparatus is a communication apparatus operating as an access point.

13. The communication apparatus according to claim 1, wherein the communication apparatus is a communication apparatus operating as a Group Owner (GO) in Wi-Fi Direct.

14. The communication apparatus according to claim 1, wherein the communication apparatus is a communication apparatus capable of performing wireless communication compliant with IEEE 802.11 series standards.

15. A control method performed by a communication apparatus, comprising:
  establishing, between the communication apparatus and a first other communication apparatus, a plurality of links including a first link via a first frequency channel and a second link via a second frequency channel;
  receiving, from the first other communication apparatus, a frame indicating that one or more links are to be disconnected or interrupted; and
  performing control
    to update a group key in a case where the receiving unit receives the frame indicating all of the plurality of links are to be disconnected or interrupted; and
    not to update the group key in a case where the receiving unit receives the frame indicating not all of the plurality of links are to be disconnected or interrupted.

16. A non-transitory computer-readable storage medium that stores a computer-program for causing a computer included in a communication apparatus to:
  establish, between the communication apparatus and a first other communication apparatus, a plurality of links including a first link via a first frequency channel and a second link via a second frequency channel;
  receive, from the first other communication apparatus, a frame indicating that one or more links are to be disconnected or interrupted; and
  perform control
    to update a group key in a case where the receiving unit receives the frame indicating all of the plurality of links are to be disconnected or interrupted; and
    not to update the group key in a case where the receiving unit receives the frame indicating not all of the plurality of links are to be disconnected or interrupted.

* * * * *